United States Patent
Wang

(10) Patent No.: US 10,958,811 B2
(45) Date of Patent: Mar. 23, 2021

(54) SYSTEMS AND METHODS FOR SYNCHRONIZING FRAME TIMING BETWEEN PHYSICAL LAYER FRAME AND VIDEO FRAME

(71) Applicant: SZ DJI TECHNOLOGY CO., LTD., Shenzhen (CN)

(72) Inventor: Xiaodong Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/704,662

(22) Filed: Dec. 5, 2019

(65) Prior Publication Data

US 2020/0112653 A1 Apr. 9, 2020

Related U.S. Application Data

(63) Continuation of application No. PCT/CN2017/099156, filed on Aug. 25, 2017.

(51) Int. Cl.
*H04N 5/10* (2006.01)
*H04N 5/073* (2006.01)
*H04N 7/56* (2006.01)

(52) U.S. Cl.
CPC ............. *H04N 5/10* (2013.01); *H04N 5/0733* (2013.01); *H04N 7/56* (2013.01)

(58) Field of Classification Search
CPC ........... H04N 5/10; H04N 5/0733; H04N 7/56
USPC ....................................................... 348/526
See application file for complete search history.

(56) References Cited

U.S. PATENT DOCUMENTS

| 6,157,674 A | 12/2000 | Oda et al. |
| 2007/0234134 A1* | 10/2007 | Shao ................. H04N 21/2383 714/701 |
| 2012/0072609 A1 | 3/2012 | Rajamani et al. |
| 2013/0198793 A1 | 8/2013 | Jones, IV et al. |
| 2014/0362740 A1* | 12/2014 | Garudadri ............. H04L 69/166 370/260 |
| 2015/0213780 A1* | 7/2015 | Tripathi ................. G09G 5/008 345/520 |
| 2016/0037192 A1* | 2/2016 | Petrov .............. H04N 21/23608 725/116 |
| 2019/0349612 A1* | 11/2019 | Takahashi ............. H04L 5/0053 |

FOREIGN PATENT DOCUMENTS

| CN | 103916668 A | 7/2014 |
| CN | 106717000 A | 5/2017 |
| WO | 2016026128 A1 | 2/2016 |

OTHER PUBLICATIONS

The World Intellectual Property Organization (WIPO) International Search Report and Written Opinion for PCT/CN2017/099156 dated May 22, 2018 7 pages.

* cited by examiner

*Primary Examiner* — Michael Lee
(74) *Attorney, Agent, or Firm* — Anova Law Group, PLLC

(57) ABSTRACT

A method implemented on a computing device including at least one processor and a storage for synchronizing video transmission with physical layer. The method includes determining a first time point corresponding to a frame header of a video frame, determining a second time point corresponding to a frame header of a physical layer frame based at least in part on the first time point, and starting transmitting the video frame at the second time point.

12 Claims, 10 Drawing Sheets

100

SYSTEMS AND METHODS FOR SYNCHRONIZING FRAME TIMING BETWEEN PHYSICAL LAYER FRAME AND VIDEO FRAME

CROSS-REFERENCE TO RELATED APPLICATION

This application is a continuation of International Application No. PCT/CN2017/099156, filed Aug. 25, 2017, the entire contents of which are incorporated herein by reference.

TECHNICAL FIELD

This application relates to systems and methods for transmission synchronization, more particularly, to systems and methods for synchronizing the frame timing between a physical layer frame and a video frame.

BACKGROUND

Unmanned movable platform (UMP) such as unmanned aerial vehicles (UAV) have been widely used in various fields such as aerial photography, surveillance, scientific research, geological survey, and remote sensing. The maneuvering of a UAV may be controlled by a user via a ground terminal. The UAV may record video data during flight and transmit the video data to the ground terminal. The ground terminal may display the video data synchronously with the recording.

In order to display the video data at the ground terminal without causing lags, it is important for the UAV to reduce time delay of transmitting the video data from the UAV to the ground terminal.

SUMMARY

According to an aspect of the present disclosure, a method for synchronizing video transmission with physical layer is provided. The method may be implemented on a computing device including at least one processor and a storage. The method may include determining a first time point corresponding to a frame header of a video frame, determining a second time point corresponding to a frame header of a physical layer frame based at least in part on the first time point, and starting transmitting the video frame at the second time point.

In some embodiments, the method may further include generating the physical layer frame at the second time point.

In some embodiments, the determining a second time point corresponding to a frame header of a physical layer frame based at least in part on the first time point may include determining the second time point based at least in part on the first time point, and synchronizing a third time point corresponding to a frame header of a physical layer frame with the second time point, the physical layer frame corresponding to the video frame.

In some embodiments, the method may further include compressing the video frame before transmitting the video frame at the second time point.

In some embodiments, the method may further include segmenting the video frame into a plurality of sub-frames, and compressing data associated with each of the plurality of sub-frames.

In some embodiments, the determining the second time point may include determining a time period for compressing a sub-frame of the plurality of sub-frames, and determining the second time point based on the first time point and the time period for compressing the sub-frame.

In some embodiments, the determining the second time point based on the first time point may include determining a time period for compressing at least a portion of the video frame, and determining the second time point based on the first time point and the time period.

In some embodiments, the frame header of the video frame may correspond to a frame synchronization pulse signal.

In some embodiments, the video frame may be extracted from a real-time video stream transmitted by a video recording device.

In some embodiments, the video frame may be extracted from a real-time video received at a data interface communicatively connected to a video recording device.

In some embodiments, the method may further include obtaining a frame rate of the video frame, and configuring a frame rate of the physical layer frame based on the frame rate of the video frame.

In some embodiments, the frame rate of the physical layer frame may be an integer multiple of the frame rate of the video frame.

According to another aspect of the present disclosure, a system for synchronizing video transmission with physical layer is provided. The system may include a memory that stores one or more computer-executable instructions, and one or more processors configured to communicate with the memory. When executing the one or more computer-executable instructions, the one or more processors may be directed to determine a first time point corresponding to a frame header of a video frame, determine a second time point corresponding to a frame header of a physical layer frame based at least in part on the first time point, and start transmitting the video frame at the second time point.

According to another aspect of the present disclosure, a non-transitory computer readable medium is provided. The non-transitory computer readable medium may include executable instructions. When the executable instructions are executed by at least one processor, the executable instructions may cause the at least one processor to effectuate a method. The method may include determining a first time point corresponding to a frame header of a video frame, determining a second time point corresponding to a frame header of a physical layer frame based at least in part on the first time point, and starting transmitting the video frame at the second time point.

According to another aspect of the present disclosure, an unmanned aerial vehicle (UAV) is provided. The UAV may include at least one video recording device, at least one processor and at least one UAV transceiver. The at least one video recording device may be configured to record video data including a plurality of video frames. The at least one processor may be configured to determine a first time point corresponding to a frame header of a video frame of the plurality of video frames, and determine a second time point corresponding to a frame header of a physical layer frame based at least in part on the first time point. The at least one UAV transceiver may be configured to start transmitting the video frame at the second time point.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
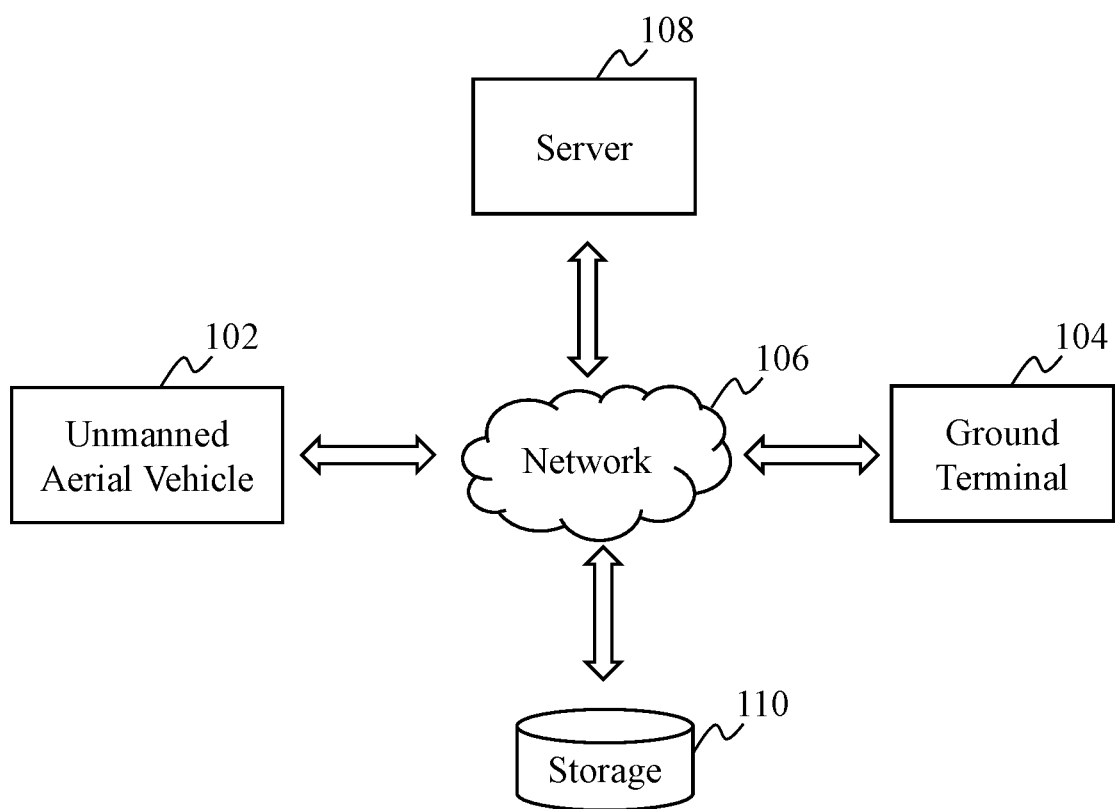
FIG. 1 illustrates a schematic diagram of an exemplary unmanned aerial vehicle (UAV) system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "module," and/or "engine" used herein are one method to distinguish different components, elements, parts, section or assembly of different level in ascending order. However, the terms may be displaced by other expression if they may achieve the same purpose.

It will be understood that when a unit, module or engine is referred to as being "on," "connected to" or "coupled to" another unit, module, or engine, it may be directly on, connected or coupled to, or communicate with the other unit, module, or engine, or an intervening unit, module, or engine may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure provides systems and methods for video transmission synchronization in a UAV system. The present disclosure adjusts a frame timing of a physical layer transmission according to frame timing of a video stream transmission. The video stream may be received directly from a video recording device carried on a UAV or at a data interface communicatively connected to a video recording device carried on the UAV. By synchronizing the frame timings between a physical layer frame and a video frame, the transmission delay of the video stream from a UAV to a ground terminal due to the wait time associated with each video frame may be reduced. Further, the present disclosure configures the frame rate of the physical layer frame to be an integer multiple of the frame rate of the video frame. Therefore, the number of adjustments of the frame timing during the video stream transmission between a UAV and a ground terminal may be reduced.

FIG. 1 illustrates a schematic diagram of an exemplary unmanned aerial vehicle (UAV) system 100 according to some embodiments of the present disclosure. The UAV system 100 may include a UAV 102, a ground terminal 104, a network 106, a server 108, and a storage 110.

The UAV 102 may be configured to collect data and transmit the collected data to the ground terminal 104 and/or the server 108 during flight. The data may include the flight status of the UAV 102, the battery usage of the UAV 102, information associated with the surrounding environment, etc. The data may further include text data, video data, audio data, etc. The video data may include videos, images, graphs, animations, audios, etc. The UAV 102 may transmit the data to the ground terminal 104 during flight to synchronously display the content of the data on the ground terminal 104.

The UAV 102 may be operated completely autonomously (e.g., by a computing system such as an onboard controller), semi-autonomously, or manually (e.g., by a user operating a control application implemented on a mobile device). In some embodiments, the UAV 102 may be operated by a user via the ground terminal 104. The UAV 102 may receive commands from an entity (e.g., human user or autonomous control system) and respond to such commands by performing one or more actions. For example, the UAV 102 may be controlled to take off from the ground, move in the air, move to target location or to a sequence of target locations, hover in the air, land on the ground, etc. As another example, the UAV 102 may be controlled to move at a specified velocity and/or acceleration or along a specified route in the air. Further, the commands may be used to control one or more UAV 102 components described in FIG. 2 (e.g., video recording device 206, sensor 210, flight controller 208, etc.).

For example, some commands may be used to control the position, orientation, and/or operation of the video recording device 206.

The ground terminal 104 may be configured to transmit, receive, output, display, and/or process information. For example, the ground terminal 104 may receive information from the UAV 102, the network 106, the server 108, the storage 110, etc. As another example, the ground terminal 104 may transmit a command generated by a user to control the UAV 102. The command may include information to control the velocity, acceleration, altitude, and/or orientation of the UAV 102. As still another example, the ground terminal 104 may display images or play videos taken by the UAV 102 to a user. As still another example, the ground terminal 104 may process information received from the server 108 to update the application installed on the ground terminal 104.

In some embodiments, the ground terminal 104 may include a desktop computer, a mobile device, a laptop computer, a tablet computer, or the like, or any combination thereof. In some embodiments, the mobile device may include a smart home device, a wearable device, a smart mobile device, a virtual reality device, an augmented reality device, or the like, or any combination thereof. In some embodiments, the smart home device may include a smart lighting device, a smart television, a smart video camera, an interphone, or the like, or any combination thereof. In some embodiments, the wearable device may include a smart bracelet, a smart footgear, a smart glass, a smart watch, a smart helmet, smart clothing, a smart backpack, a smart accessory, or the like, or any combination thereof. In some embodiments, the smart mobile device may include a smartphone, a gaming device, a navigation device, a point of sale (POS) device, or the like, or any combination thereof.

The network 106 may be configured to facilitate exchange of information. In some embodiments, one or more components in the UAV system 100 (e.g., the UAV 102, the ground terminal 104, the server 108 and the storage 110) may send information to other components in the UAV system 100 via the network 106. For example, the ground terminal 104 may receive videos and/or images from the UAV 102 via the network 106. In some embodiments, the network 106 may be any type of a wired or wireless network, or a combination thereof. Merely by way of example, the network 106 may include a cable network, a wire line network, an optical fiber network, a telecommunication network, an intranet, an Internet, a local area network (LAN), a wide area network (WAN), a wireless local area network (WLAN), a metropolitan area network (MAN), a wide area network (WAN), a public telephone switched network (PSTN), a Bluetooth® network, a ZigBee® network, a near field communication (NFC) network, or the like, or any combination thereof. In some embodiments, the network 106 may include wired or wireless network access points such as base stations and/or internet exchange points (not shown), through which one or more components of the UAV system 100 may be connected to the network 106 to exchange information. In some embodiments, the base stations and/or internet exchange points may be a Wi-Fi station. In some embodiments, the UAV and/or the ground terminal 104 may access to the network 106 through a competition-based random access manner or a non-competition-based random access manner.

The server 108 may be configured to process data. The data may be received from the UAV 102, the ground terminal 104, the network 106, the storage 110, etc. For example, the server 108 may archive the flight log information from the UAV 102 in the storage 110. As another example, the server 108 may back up information from the ground terminal 104 in the storage 110. The server 108 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a micro-controller unit, a reduced instruction-set computer (RISC), a microprocessor, or the like, or any combination thereof. In some embodiments, the server 108 may be integrated in the ground terminal 104.

The storage 110 may be configured to acquire and/or store information. The information may be received from components of the UAV system 100 (e.g., the UAV 102, the ground terminal 104, or the server 108, etc.). For example, the storage 110 may acquire information from the ground terminal 104. In some embodiments, the information acquired and/or stored in the storage 110 may include programs, software, algorithms, functions, files, parameters, data, texts, numbers, images, or the like, or any combination thereof. For example, the storage 110 may store images collected by the UAV 102. As another example, the storage 110 may store parameters (e.g., latitude, longitude, altitude of the UAV 102) from the ground terminal 104. In some embodiments, the storage 110 may include a mass storage, a removable storage, a volatile read-and-write memory, a read-only memory (ROM), or the like, or any combination thereof. In some embodiments, the storage 110 may be implemented on a cloud platform including a private cloud, a public cloud, a hybrid cloud, a community cloud, a distributed cloud, an inter-cloud, a multi-cloud, or the like, or any combination thereof.

It should be noted that the above description of the UAV system 100 is merely provided for the purpose of illustration, and is not intended to limit the scope of the present disclosure. For persons having ordinary skills in the art, multiple variations or modifications may be made under the teachings of the present disclosure. For example, the UAV 102 may be any type of remote device that records and transmits video data, including but is not limited to a monitoring device, a wireless sensing network device, a smart home device, an onboard video device, etc. However, these variations and modifications may not depart from the scope of the present disclosure.

Figure 2:
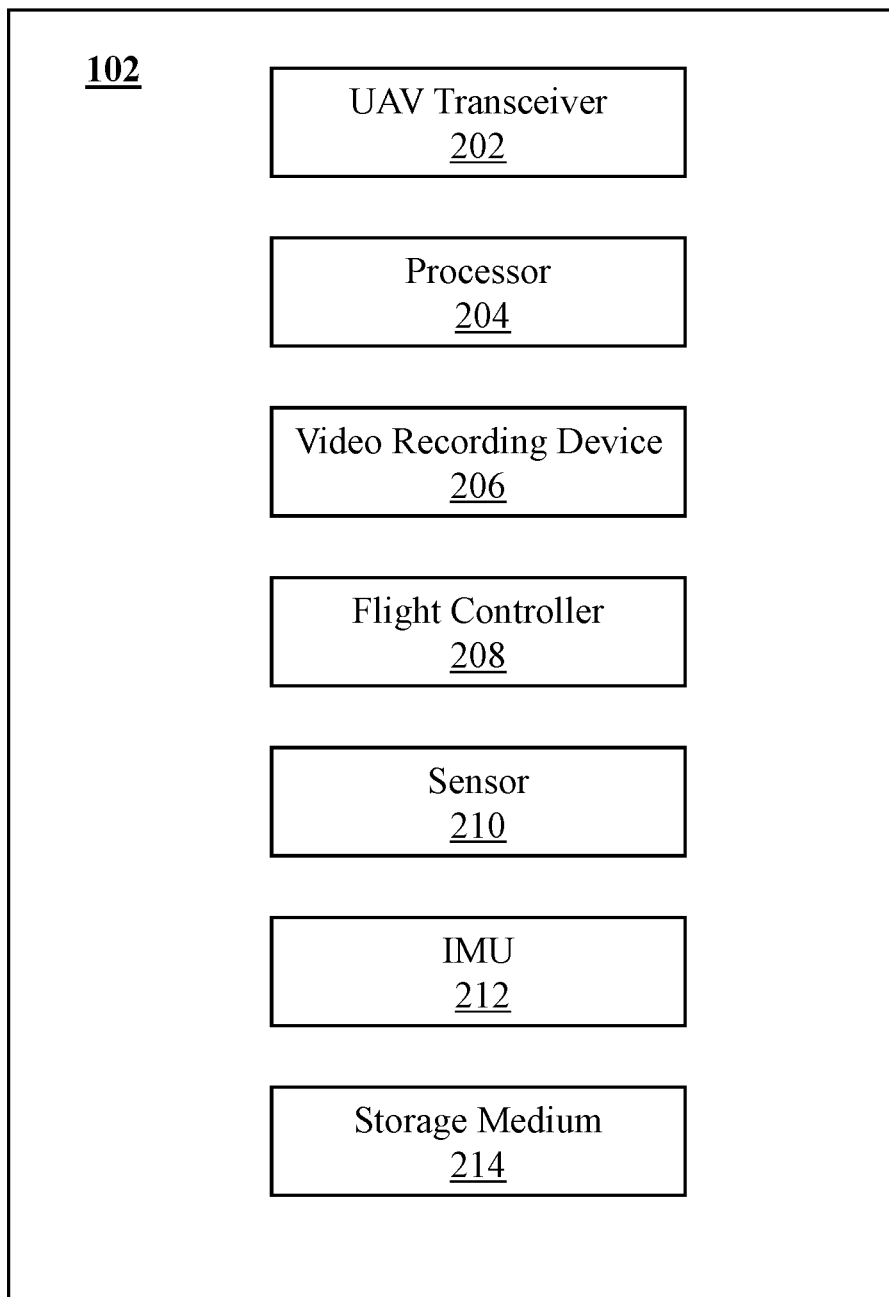
FIG. 2 illustrates a block diagram of an exemplary unmanned aerial vehicle (UAV) according to some embodiments of the present disclosure.

FIG. 2 illustrates a block diagram of an exemplary unmanned aerial vehicle (UAV) 102 according to some embodiments of the present disclosure. The UAV 102 may include an UAV transceiver 202, a processor 204, a video recording device 206, a flight controller 208, a sensor 210, an inertial measurement unit (IMU) 212, and storage medium 214.

The UAV transceiver 202 may transmit and/or receive data. The data may include text, videos, images, audios, animations, graphs, or the like, or any combination thereof. In some embodiments, the UAV 102 may communicate with the ground terminal 104 via the UAV transceiver 202. For example, the UAV transceiver 202 may transmit a video processed by the processor 204 to the ground terminal 104, for example, the compressed video. As another example, the UAV transceiver 202 may receive commands from the ground terminal 104 to maneuver the motion of the UAV 102. The UAV transceiver 202 may be any type of transceiver. For example, the UAV transceiver 202 may be a radio frequency (RF) transceiver that is capable of transmitting or receiving data through a wireless network. More particularly, the wireless network may operate in various frequency bands, such as 433 MHz, 900 MHz, 2.4 GHz, 5 GHz, 5.8 GHz, etc. In some embodiments, the UAV transceiver 202 may include a transmitter and a receiver. The transmitter and the receiver may each implement part or all of the functions of the UAV transceiver 202.

The processor 204 may process data. The data may be received from other components of the UAV 102 (e.g., the UAV transceiver 202, the video recording device 206, or the storage medium 214, etc.). For example, the processor 204 may process data received by the UAV transceiver 202. As another example, the processor 204 may process data to be transmitted to the ground terminal 104 via the UAV transceiver 202. As still another example, the processor 204 may receive video data from the video recording device 206. The processor 204 may compress the video data, adjust the video data and transmit the adjusted video data to the ground terminal 104 via the UAV transceiver 202. The adjustment may include synchronizing the transmission of the video data with physical layer. The processor 204 may receive data from the sensor 210, the flight controller 208, and the IMU 212 to evaluate the status of the UAV 102 and determine a course of action. For example, the processor 204 may constantly and/or periodically communicate with the IMU 212, which may measure the UAV 102's velocity and attitude data, and adaptively adjust the position of the UAV 102. In some embodiments, the processor 204 may include one or more processors (e.g., single-core processors or multi-core processors). In some embodiments, the processor 204 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The video recording device 206 may capture video data. The video data may include images, videos, audios, graphs, animations, etc. The video recording device 206 may be a camera, a vidicon, a video recorder, a digital camera, an infrared camera, or an ultraviolet camera, etc. The video recording device 206 may send the captured video data to the processor 204 for processing. For example, the video recording device 206 may send the captured video data to the processor 204. The processor 204 may compress the video data and cause transmission of the compressed video data to the ground terminal 104. The ground terminal 104 may receive and decompress the video data. In some embodiments, the UAV 102 may include a holder/pan-tilt device (not shown in FIG. 2) for mounting and/or stabilizing the video recording device 206, for example, a gimbal with at least one axis. The processor 204 may control the operation of the holder/pan-tilt device to adjust the position of the video recording device 206.

The flight controller 208 may control propulsion of the UAV 102 to control the pitch angle, roll angle, and/or yaw angle of the UAV 102. The flight controller 208 may alter the speed, orientation and/or position of the UAV 102. For example, upon receiving data from the ground terminal 104 including a user-defined route plan, the processor 204 may interpret the data and send corresponding instructions to the flight controller 208. The flight controller 208 may alter the speed and/or position of the UAV 102 based on the instructions.

The sensor 210 may collect relevant data. The relevant data may include information relating to the UAV status, the surrounding environment, or the objects within the environment. The sensor 210 may include a location sensor (e.g., a global positioning satellite (GPS) sensor, a mobile device transmitter enabling location triangulation), a vision sensor (e.g., an imaging device capable of detecting visible, infrared, or ultraviolet light, such as a camera), a proximity or range sensor (e.g., an ultrasonic sensor, LIDAR (Light Detection and Ranging), a time-of-flight or depth camera), an inertial sensor (e.g., an accelerometer, a gyroscope, an inertial measurement unit (IMU)), an altitude sensor, an attitude sensor (e.g., a compass, an IMU), a pressure sensor (e.g., a barometer), an audio sensor (e.g., a microphone), a field sensor (e.g., a magnetometer, an electromagnetic sensor), or the like, or any combination thereof. Data collected by the sensor 210 may be sent to the processor 204.

The IMU 212 may measure an angular velocity (e.g., attitude change) and a linear acceleration (e.g., velocity change) of the UAV 102. For example, the IMU 212 may include one or more gyroscopes to measure attitude change (e.g., absolute or relative pitch angle, roll angle, and/or yaw angle) of the UAV, and may include one or more accelerometers to measure linear velocity change (e.g., acceleration along x, y, and/or z directions) of the UAV 102. In some embodiments, the IMU 212 may be integrated in the sensor 210.

The storage medium 214 may store data. The data may be obtained from the UAV transceiver 202, the processor 204, the video recording device 206, the flight controller 208, the sensor 210, the IMU 212, and/or any other devices. The data may include image data, video data, metadata associated with the image data and the video data, instruction data, etc. The storage medium 214 may include a hard disk drive, a solid-state drive, a removable storage drive (e.g., a flash memory disk drive, an optical disk drive, etc.), a digital video recorder, or the like, or any combination thereof.

It should be noted that the above description of the UAV 102 is merely provided for the purposes of illustration, and is not intended to limit the scope of the present disclosure. For persons having ordinary skills in the art, multiple variations or modifications may be made under the teachings of the present disclosure. For example, some other components may be implemented in the UAV 102, e.g. a battery may be implemented in the UAV 102 as a power supply. As another example, the UAV 102 may include an electronic speed controller (ESC) for controlling or adjusting the rotation speed of motors mounted therein. However, those variations and modifications may not depart from the scope of the present disclosure.

Figure 3:
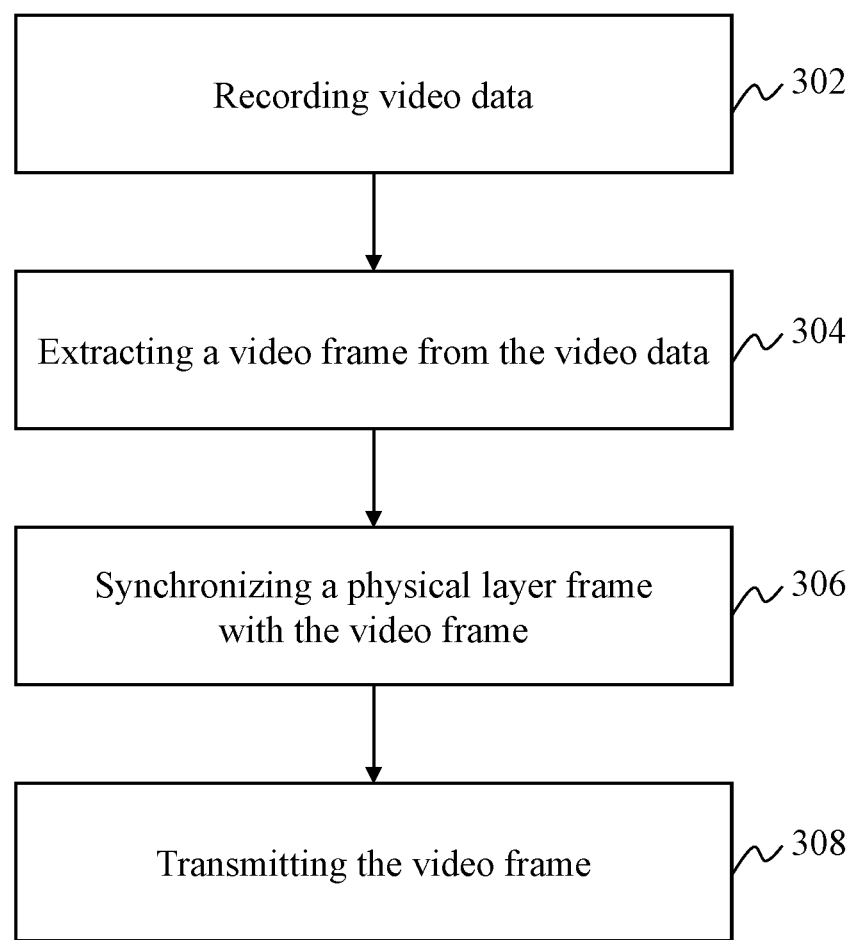
FIG. 3 illustrates a flowchart of an exemplary process for video transmission in a UAV system according to some embodiments of the present disclosure.

FIG. 3 illustrates a flowchart of an exemplary process 300 for video transmission in a UAV system according to some embodiments of the present disclosure. In some embodiments, the exemplary process 300 may be implemented by one or more processors of the UAV 102.

In step 302, video data may be recorded. In some embodiments, step 302 may be implemented by the video recording device 206 (illustrated in FIG. 2). The video data may include videos, audios, images, graphs, animations, or the like, or any combination thereof. In some embodiments, the video data may include a plurality of video frames. In some embodiments, step 302 may be performed in response to a request received from the processor 204 or the ground terminal 104. For example, a user of the ground terminal 104 may send a request for recording video data via a user interface (e.g., the user interface 408 illustrated in FIG. 4). Upon receiving the request, the video recording device 206 may be activated to record the video data. As another example, commands to record the video data may be pre-programmed by the user via ground terminal 104 and stored in storage medium 214 of the UAV 102. The recording of the video data may be controlled by the processor 204 via executing the pre-programmed commands stored in the storage medium 214.

In step 304, a video frame may be extracted from the video data. In some embodiments, step 304 may be implemented by the processor 204. As used herein, the video frame may refer to a frame of the video data. The video frame may correspond to a length of time depending on the compressing algorithms. In some embodiments, the video frame may be a still image. The video frame may include a frame header. The frame header may indicate the start of the video frame transmission. The frame header may include information of the video frame, such as synchronization information, address information, error control information, coding information, etc. The synchronization information may include a start time point and/or an end time point of the video frame. In some embodiments, the frame header may correspond to a frame synchronization pulse signal. The frame synchronization pulse signal may indicate the start time point of the video frame. In some embodiments, the video frame may be segmented into a plurality of sub-frames. Data associated with each of the plurality of sub-frames may be compressed and/or packed into a data package for transmission. Each of the plurality of sub-frames may correspond to a portion of the video frame. The lengths of the segmented sub-frames may be the same or different.

In step 306, transmission of a physical layer frame may be synchronized with transmission of the video frame over the physical layer. In some embodiments, step 306 may be implemented by the processor 204. In an open system interconnection (OSI) architecture, the physical layer defines the means of transmitting raw bits over a physical link connecting network nodes. The bit stream may be converted to a physical signal to be transmitted over a hardware transmission medium. The physical layer comprises a physical signaling sublayer that interfaces with the data link layer's media access control (MAC) sublayer and performs signaling control of transmission and reception. The physical layer frame according to the present application refers to a frame generated by the physical layer of the OSI architecture that performs signaling control of transmission and reception via the physical layer. The transmission of a data package (e.g., a compressed and/or packed video frame or sub-frame thereof) through the physical layer is controlled by a physical layer frame. In particular, transmission of the first bit of the physical layer frame may signal the allowability of transmitting the first bit of the data package (e.g., compressed and/or packed video frame or sub-frame thereof). That is, the timing of transmitting the first bit of the data package (also referred to as frame timing of the video frame) needs to be synchronous to the timing of transmitting the first bit of the physical layer frame (also referred to as frame timing of the physical layer frame). When the frame timing of the video frame is asynchronous to the frame timing of the physical layer frame, the video frame may not be transmitted immediately. When it is determined that the frame timing of the video frame is synchronous to a frame timing of one of the succeeding physical layer frames from the current physical layer frame, transmission of the video frame through the physical layer may be allowed. As the UAV 102 may access the network 106 in a non-competition-based random access scheme, the physical layer frame for transmission control may be generated in a random basis. In some embodiments, the physical layer frames may be generated in accordance to a scheduling of a timer of the physical layer. The frame timing of the physical layer frame and the frame timing of the video frame may be asynchronous. As a result, the start of the physical layer frame transmission (also referred to as the frame header of physical layer frame) and the start of the video frame transmission (also referred to as a time point that a compressed and/or packed sub-frame can be transmitted) through the physical layer may be asynchronous. For example, when a sub-frame of the video frame is compressed and/or packed into a data package and ready to be transmitted in the physical layer, the expected transmission starting time may fall in the middle of transmission of a physical layer frame. The compressed sub-frame, i.e., the data package, may have to wait for a period of time (also referred to as a wait time) before being transmitted and thus, causing a transmission delay. As the physical layer frame for transmission control may be generated in a random basis or in accordance to the scheduling of the timer of the physical layer, the wait time before a data package is allowed to transmit is unpredictable. In order to reduce the wait time before transmission of the data package, the frame header of the physical layer frame may be adjusted. For example, the time point corresponding to the frame header of the physical layer frame may be adjusted to be synchronized with the time point at which the compressed and/or packed sub-frames are expected to transmit. Detailed process of the synchronization may be found elsewhere in the present disclosure (e.g., in the description of FIG. 6, FIG. 8A, FIG. 8B, etc.).

In step 308, the video frame may be transmitted. In some embodiments, step 308 may be implemented by the processor 204. The video frame may be sent to one or more other components of the UAV 102, such as the UAV transceiver 202, the storage medium 214, etc. For example, the video frame may be sent to the UAV transceiver 202 for processing. The processing may include amplification, analog-to-digital conversion, digital-to-analog conversion, etc. The UAV transceiver 202 may send the processed data to the ground terminal 104. As another example, the video frame may be stored in the storage medium 214. In some embodiments, the video frame may be transmitted in a physical layer. As described in step 306, the physical layer frame may be synchronized with the video frame so that the time point when the video frame (or a compressed and/or packed sub-frame thereof) can be transmitted is synchronized with the frame header of the physical layer frame. The video frame (or the compressed and/or packed sub-frames thereof) may be transmitted with the physical layer frame in the physical layer.

It should be note that the steps as shown in FIG. 3 are for illustrative purpose, and are not intended to limit the protection scope of the present disclosure. In some embodiments, the process 300 may be accomplished with one or more additional steps not described, and/or without one or more the steps discussed above. Additionally, the order that the steps of the process 300 are performed in FIG. 3 is not intended to be limiting. For example, one or more other optional steps may be added between any two steps in the process illustrated in FIG. 3. Examples of such steps may include storing or caching the video data, or the like.

Figure 4:
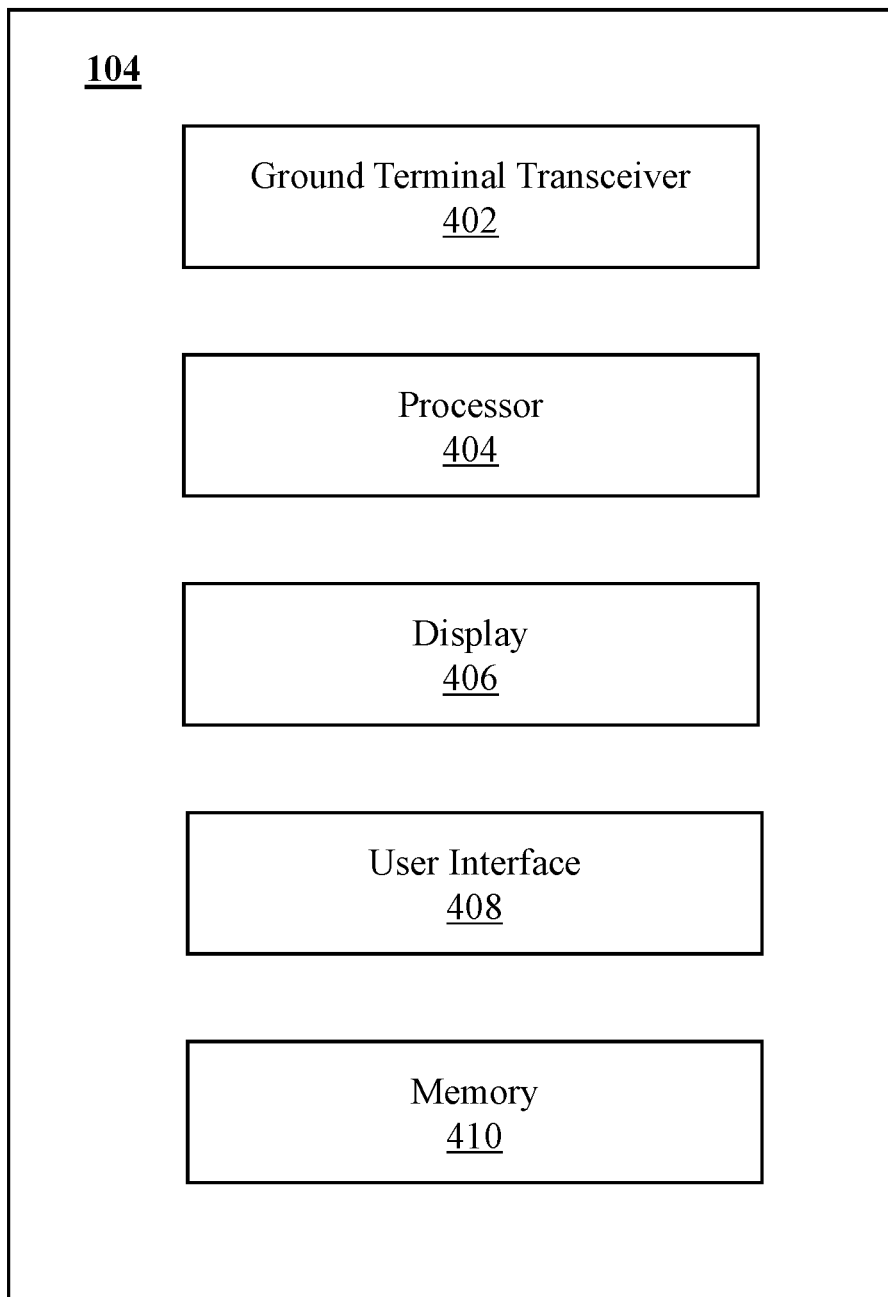
FIG. 4 illustrates a block diagram of an exemplary ground terminal in a UAV system according to some embodiments of the present disclosure.

FIG. 4 illustrates a block diagram of an exemplary ground terminal 104 in a UAV system according to some embodiments of the present disclosure. The ground terminal 104 may include a ground terminal transceiver 402, a processor 404, a display 406, a user interface 408, and a memory 410.

The ground terminal transceiver 402 may transmit and/or receive data. The data may include text, videos, images, audios, animations, graphs, or the like, or any combination thereof. In some embodiments, the ground terminal 104 may communicate with the UAV 102 via the ground terminal transceiver 402. For example, the ground terminal transceiver 402 may transmit an instruction (e.g., an instruction to record video data) from the processor 404 to the UAV transceiver 202. Upon receiving the instruction from the ground terminal 104, the UAV transceiver 202 may send the instruction to the video recording device to start recording video data. The ground terminal transceiver 402 may be any type of transceiver. For example, the ground terminal transceiver 402 may be a radio frequency (RF) transceiver that is capable of transmitting or receiving data over a wireless network. More particularly, the wireless network may operate in various frequency bands, such as 433 MHz, 900 MHz, 2.4 GHz, 5 GHz, 5.8 GHz, etc. In some embodiments, the ground terminal transceiver 402 may include a transmitter and a receiver. The transmitter and the receiver may each implement part or all functions of the ground terminal receiver 402.

The processor 404 may process data. The data may be received from the ground terminal transceiver 402, the memory 410, etc. The data may include information relating to the state of the UAV 102 (e.g., velocity, acceleration, altitude, etc.), image data, video data, a user instruction (e.g., an instruction to increase altitude of the UAV 102), etc. In some embodiments, the processing of the data may include storing, classifying, selecting, transforming, calculating, estimating, encoding, decoding, or the like, or any combination thereof. For example, the processor 404 may decompress a compressed video frame received from the UAV 102. As another example, the ground terminal 104 may receive an application updating package from the server 108 via the ground terminal transceiver 402. The processor 404 may process the application updating package to update the related mobile application installed on the ground terminal 104. As still another example, the processor 404 may process data from the memory 410 to view the historical flight logs. In some embodiments, the processor 404 may include one or more microprocessors, filed programmable gate arrays (FPGAs), central processing units (CPUs), digital signal processors (DSPs), etc.

The display 406 may display information. The information may include text, audios, videos, images, or the like, or any combination thereof. The display 406 may include a liquid crystal display (LCD), a light emitting diode (LED)-based display, a flat panel display or curved screen, a television device, a cathode ray tube (CRT), or the like, or a combination thereof. In some embodiments, the display 406 may include a touchscreen. In some embodiments, the information displayed on the display 406 may relate to the status of the UAV 102, such as altitude, velocity, etc. In some embodiments, images and/or videos captured by the video recording device 206 may be displayed on the display 406.

The user interface 408 may receive user interactions with the ground terminal 104 and generate one or more instructions to operate one or more components of the ground terminal 104 or other components in the UAV system 100. The one or more instructions may include an instruction to operate the ground terminal transceiver 402 to communicate with the UAV transceiver 202, an instruction to operate the processor 404 to process data received from the ground terminal transceiver 402, an instruction to operate the display 406 to display images and/or videos received, an instruction to operate the memory 410 to store data, an instruction operate the UAV 102 to capture video data, or the like, or any combination thereof. In some embodiments, the user interface 408 may include one or more input devices, such as a touchscreen, a keyboard, a mouse, a trackball, a joystick, a stylus, an audio recognition device or application, etc. For example, a keyboard may be integrated in the ground terminal 104. An instruction may be generated in response to pressing down a plurality of keys on the keyboard in a certain sequence by a user. In some embodiments, the instruction may direct the UAV 102 to adjust flight attitudes. In some embodiments, the instruction may direct the video recording device 206 to take a photo or to record a video. In some embodiments, the instruction may direct the display 406 to display the photo or the video. In some embodiments, the instruction may direct the memory 410 to store data. For example, after a video is obtained, the memory 410 may receive an instruction to store the video.

The memory 410 may store data. The data may be obtained from the ground terminal transceiver 402, the processor 404, the display 406, the user interface 408, and/or any other components in the UAV system 100. The data may include image data, video data, metadata associated with the image data and the video data, instruction data, etc. In some embodiments, the memory 410 may include a hard disk drive, a solid-state drive, a removable storage drive (e.g., a flash memory disk drive, an optical disk drive, etc.), a digital video recorder, or the like, or a combination thereof.

It should be noted that the above description of the ground terminal 104 is merely provided for the purposes of illustration, and is not intended to limit the scope of the present disclosure. For persons having ordinary skills in the art, multiple variations or modifications may be made under the teachings of the present disclosure. For example, one or more components of the ground terminal 104 may include an independent storage block (not shown) respectively. However, those variations and modifications may not depart from the scope of the present disclosure.

Figure 5:
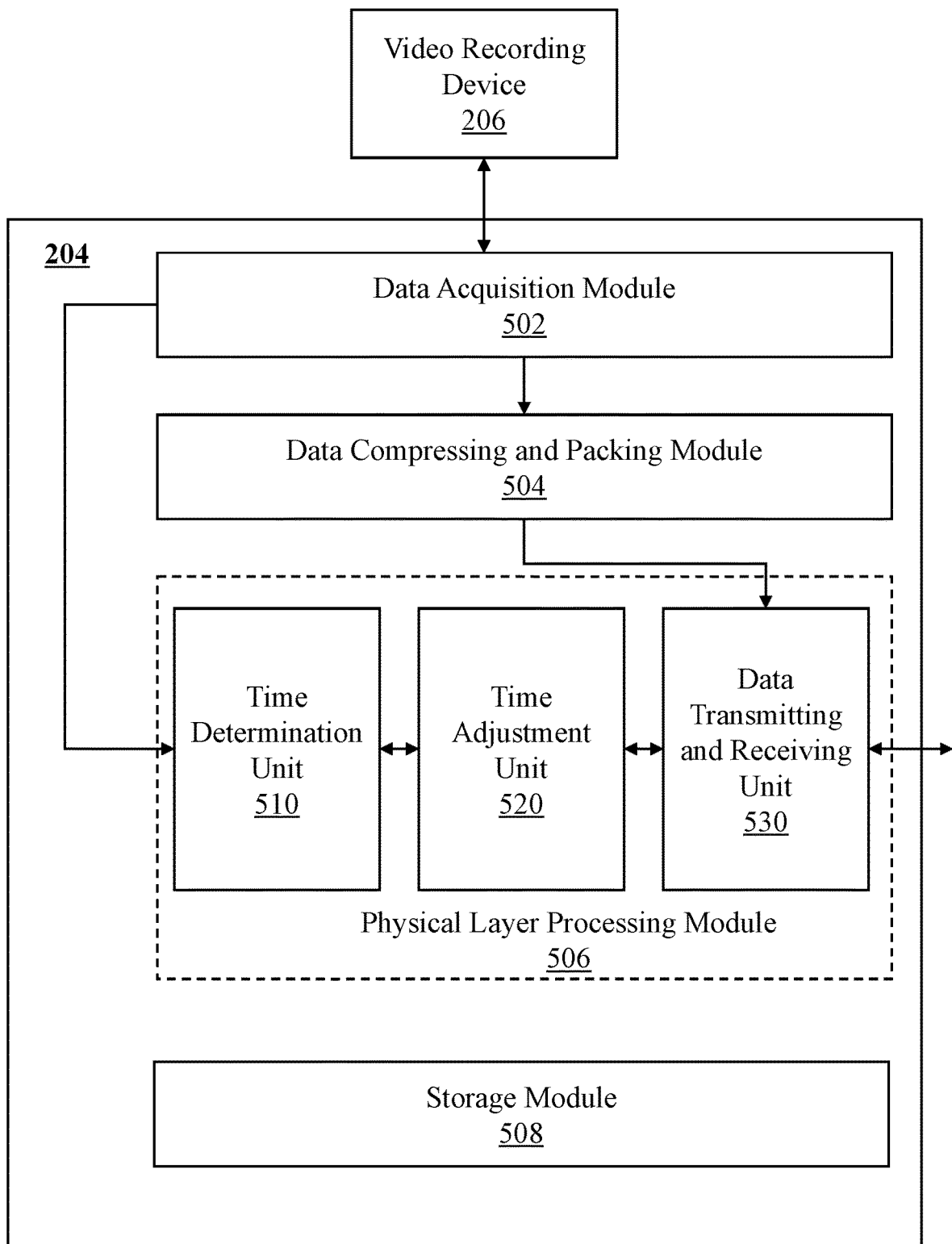
FIG. 5 illustrates a block diagram of an exemplary processor in a UAV system according to some embodiments of the present disclosure.

FIG. 5 illustrates a block diagram of an exemplary processor 204 in a UAV system according to some embodiments of the present disclosure. The processor 204 may include a data acquisition module 502, a data compressing and packing module 504, a physical layer processing module 506, and a storage module 508. The modules in the processor 204 may be connected in a wired or wireless manner.

The data acquisition module 502 may obtain data. The data may relate to the UAV 102 (e.g., velocity of the UAV 102), the surrounding environment (e.g., temperature, barometric pressure, etc.), or objects within the environment. The data may include image data, audio data, video data, or the like, or any combination thereof. The data may be obtained from the UAV transceiver 202, the video recording device 206, the storage medium 214, or other components of the UAV system 100. In some embodiments, the video data may include a real-time video stream. The real-time video stream may be transmitted by the video recording device 206, or received at a data interface communicatively connected to the video recording device 206. The video data may include a plurality of video frames. Each of the plurality of video frames may have a frame header. The frame header of each of the plurality of video frames may correspond to a frame synchronization pulse signal. The frame synchronization pulse signal may indicate a start time point of transmitting the each of the plurality of video frames in the physical layer.

The data compressing and packing module 504 may compress and/or pack data. The data may be received from the data acquisition module 502, or the storage module 508. The data compressing and packing module 504 may be configured to reduce the redundancy in the data. The redundancy may include temporal redundancy, spatial redundancy, statistical redundancy, perceptual redundancy, etc. The data may be compressed in various compression algorithms. The compression algorithms may include lossless data compression, and lossy data compression. The lossless data compression may include run-length encoding (RLE), Lempel-Ziv compression, Huffman coding, prediction by partial matching (PPM), bzip2 compression, or the like, or any combination thereof. The lossy data compression may include fractal compression, vector quantization, wavelet compression, linear predictive coding, or the like, or any combination thereof. In some embodiments, the data may be video data. The video data may be compressed under a video coding standard. The video coding standard may include but not limited to H.120, H.261, H.262, H.263, H.264, high efficiency video coding, MPEG-4, or the like, or any combination thereof.

In some embodiments, the data compressing and packing module 504 may also be configured to pack the compressed data. For example, the compressed data may be packed in various formats. Exemplary packaging formats may include an AVI format, a DV-AVI format, a WMV format, a MP4 format, a RMVB format, a MOV format, a FLV format, or the like, or any combination thereof. In some embodiments, the compressed data may be packed into a data package that complies with the physical layer protocols.

As described elsewhere in the present disclosure, a video frame may be segmented into a plurality of sub-frames of the same or different lengths. Each of the plurality of sub-frames may correspond to a portion of the video frame. The data compressing and packing module 504 may compress data associated with the each of the plurality of sub-frames. Alternatively or additionally, the compression and packing module 504 may further pack the compressed data.

The physical layer processing module 506 may be configured to process data. The data may be obtained from the data acquisition module 502 or the data compressing and packing module 504. In some embodiments, the processing of the data may include extracting a frame header from a video frame, determining a time point and/or a time period, synchronizing two or more time points, or the like, or any combination thereof. For example, a video frame may be acquired by the data acquisition module 502 from the video recording device 206. A sub-frame of the video frame may then be compressed and/or packed by the data compressing and packing module 504. The compressed and/or packed sub-frame may be transmitted in the physical layer. A physical layer frame may control the data transmission (including the transmission of the compressed and/or packed sub-frame) in the physical layer. A frame header of the physical layer frame which corresponds to a time point at which the data transmission starts may be determined. However, the start of the physical layer frame transmission (or referred to as the frame header of physical layer frame) and the start of the video frame transmission (or referred to as a time point that a compressed and/or packed sub-frame can be transmitted) may be asynchronous. Therefore, the sub-frame may have to wait for a period of time (also referred to as a wait time) before being transmitted and a delay may be caused. In order to reduce the wait time and delay, the frame header of the physical layer frame may be adjusted. For example, the time point corresponding to the frame header of the physical layer frame may be adjusted to be synchronized with the time point at which the compressed and/or packed sub-frames can be transmitted. Detailed process of the synchronization may be found in, for example, FIG. 6 and the description thereof.

The physical layer processing module 506 may include a time determination unit 510, a time adjustment unit 520, and a data transmitting and receiving unit 530.

The time determination unit 510 may be configured to determine a time point and/or a time period. The time point may correspond to a frame header of a video frame, or a frame header of a physical layer frame. The time point may also include a time point that the compression and/or packing of the video frame is started or completed, a time point that the compression and/or packing of the sub-frame of the video frame is started or completed, a time point that a camera (e.g., the video recording device 206) starts to record video data, etc. In some embodiments, the time point may be determined based on a signal. For example, the frame header of the video frame may correspond to a frame synchronization pulse signal. The time point corresponding to the frame header of the video frame may be determined based on the frame synchronization pulse signal. As another example, the frame header of the physical layer frame may correspond to a physical layer pulse signal. The time point corresponding to the frame header of the physical layer frame may be determined based on the physical layer pulse signal. Merely by way of example, the frame synchronization pulse signal may indicate a time point of receiving the video frame from the video recording device.

The time period may include a time period for compressing and/or packing the video frame, a time period for compressing and/or packing the sub-frame of the video frame, a time period for transmitting the physical layer frame (and/or the compressed and packed sub-frames), or a time period that the processor 204 operates, etc. In some embodiments, the time period of compressing and/or packing the video frame (or sub-frames thereof) may be determined based on the length of the video frame and the compression and/or packing algorithms used. In some embodiments, the time determination unit 510 may be implemented by a timer. The timer may be a counter that provides an internal reading. The reading may rise in every fixed time period (e.g., a microsecond, a millisecond, a second, etc.). In some embodiments, when the reading reaches a preset number, the timer may generate a signal and the reading may be zeroed. In some other embodiments, the timer may generate a signal periodically without zeroing its reading. For example, the signal is generated when the reading is a multiple of 100. In some embodiments, the timer may record its internal reading when a frame synchronization pulse signal is detected (e.g., at a time point corresponding to the frame header of the video frame). In some embodiments, the timer may record the time period (or a number increase in its internal reading) of compressing and/or packing the sub-frame.

The time adjustment unit 520 may be configured to adjust the time point and/or time period determined by the time determination unit 510. For example, the time adjustment unit 520 may adjust the time point corresponding to the frame header of the physical layer frame. More particularly, the time point may be adjusted such that the time point corresponding to the frame header of the physical layer frame may be synchronized with a time point when the compressed and/or packed sub-frames are ready to be transmitted. The compressed and/or packed sub-frame may be transmitted with the physical layer frame in the physical layer. In some embodiments, the period of time of a present physical layer frame may be extended or shorten such that the frame header of the succeeding physical layer frame is synchronized with the sub-frame to be transmitted. In some other embodiments, internal reading of the timer may control the frame header of the physical layer frame. For example, a physical layer frame is generated when the reading of the timer reaches a certain value. By changing the readings of the timer, the frame header of the physical layer frame may be shifted such that the frame header of the succeeding physical layer frame is synchronized with the time point that the sub-frame is ready to be transmitted. Detailed description about the adjustment may be found in FIG. 6, FIG. 8A and FIG. 8B.

The data transmitting and receiving unit 530 may be configured to transmit and receive data. The data may include data received from the data compressing and packing module 504 (e.g., a compressed and/or packed video frame, a compressed and/or packed sub-frame), the storage module 508, or other components of the UAV system 100 (e.g., the UAV transceiver 202, the storage medium 214, etc.), etc. For example, the compressed and/or packed sub-frame received from the data compressing and packing module 504 may be transmitted by the data transmitting and receiving unit 530 to the UAV transceiver 202 for processing. The compressed and/or packed sub-frame may be transmitted in the physical layer. The processing may include amplification, analog-to-digital conversion, digital-to-analog conversion, etc. The UAV transceiver 202 may send the processed data to the ground terminal 104. As another example, the data transmitting and receiving unit 530 may obtain data from the storage module 508.

The storage module 508 may be configured to store data. The data may be obtained from the data acquisition module 502, the data compressing and packing module 504, the physical layer processing module 506, and/or other devices. The data may include programs, software, algorithms, functions, files, parameters, text, numbers, images, videos, audios, or the like, or any combination thereof. In some embodiments, the storage module 508 may include a hard disk drive, a solid-state drive, a removable storage drive (e.g., a flash memory disk drive, an optical disk drive, etc.), a digital video recorder, or the like, or a combination thereof.

It should be noted that the above description about the processor 204 is merely for the purposes of illustration, and is not intended to limit the scope of the present disclosure. For persons having ordinary skills in the art, multiple variations and modifications may be made under the teaching of the present disclosure. In some embodiments, the storage module 508 may be omitted from the processor 204 and/or incorporated into the storage medium 214. However, those variations and modifications may not depart from the scope of the present disclosure.

Figure 6:
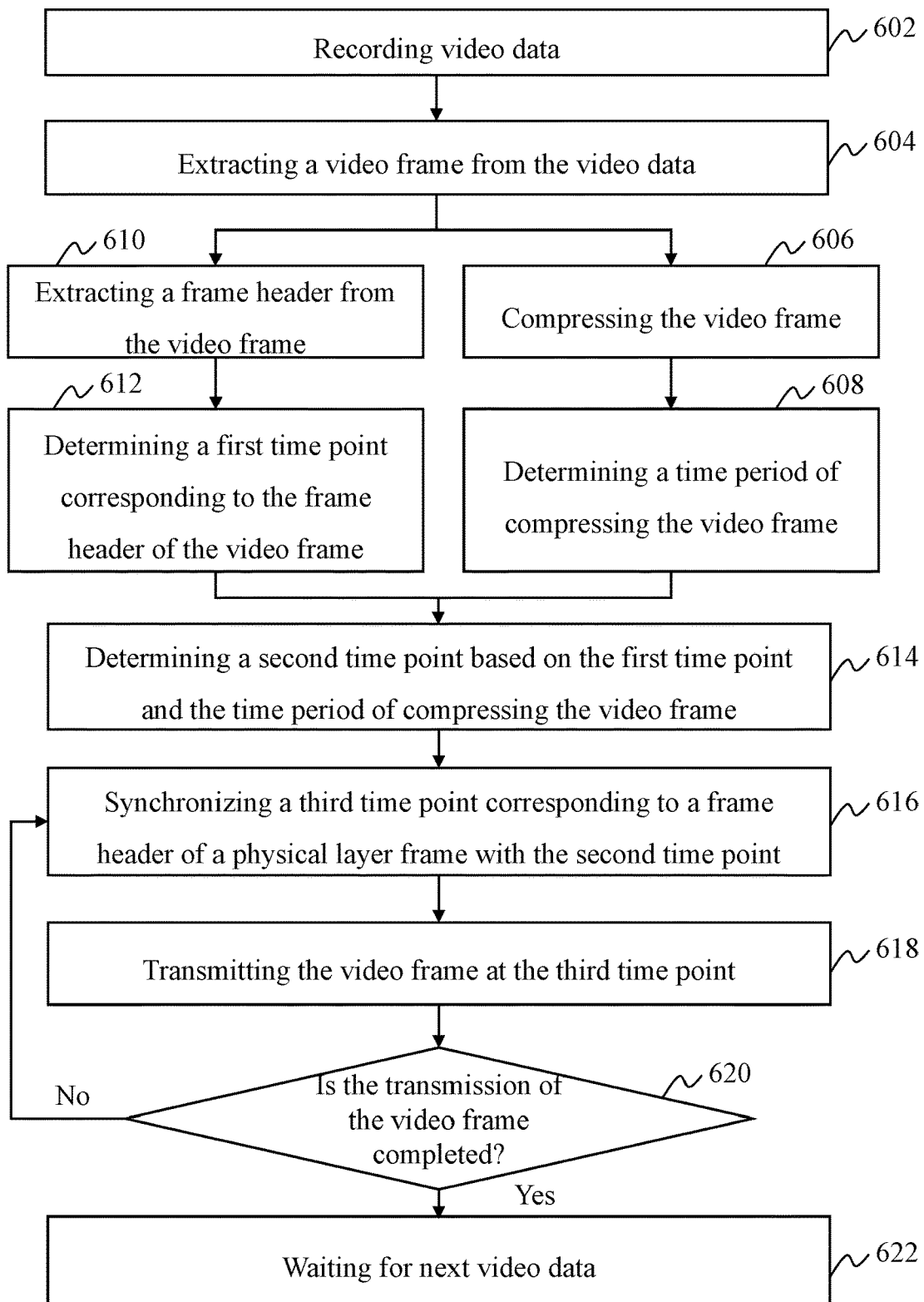
FIG. 6 illustrates a flowchart of an exemplary process for transmitting a video frame in a UAV system according to some embodiments of the present disclosure.

FIG. 6 illustrates a flowchart of an exemplary process 600 for transmitting a video frame in a UAV system according to some embodiments of the present disclosure. In some embodiments, the process 600 may be implemented by the processor 204.

In step 602, video data may be recorded. In some embodiments, step 602 may be implemented by the video recording device 206. Step 602 may be similar to Step 302 of FIG. 3, and is not repeated here.

In step 604, a video frame may be extracted from the video data. In some embodiments, step 604 may be implemented by the data acquisition module 502. As used herein, the video frame may refer to a frame of the video data. The video frame may correspond to a length of time. In some embodiments, the video frame may be a still image.

In step 606, the video frame may be compressed. In some embodiments, step 606 may be implemented by the data compressing and packing module 504. The video frame may be segmented into a plurality of sub-frames. Data associated with each of the plurality of sub-frames may be compressed. Each of the plurality of sub-frames may correspond to a portion of the video frame. The video frame may be segmented into a plurality of sub-frames of the same or different lengths. Related description about the compression may be found in the description of the data compressing and packing module 502.

In step 608, a time period for compressing the video frame may be determined. In some embodiments, step 608 may be implemented by the physical layer processing module 506. The time period for compressing the video frame may be determined based on the length of the video frame and the compressing algorithms used. In some embodiments, the time period for compressing the video frame may refer to the sum of time periods of compressing all the sub-frames of the video frame. In some embodiments, the time period of compressing the video frame in the present application may also refer to a time period of compressing a sub-frame of the video frame.

In some embodiments, the compressed video frame (or sub-frames thereof) may be further packed in step 606. In this case, the time period determined in step 608 may include the time period for both compressing and packing the video frame (or the sub-frames thereof). In some embodiments, the time period for compressing the video frame may include other processing time of the video frame before transmission, for example, the time for adding redundancy check bits to the packed video frame.

In step 610, a frame header may be extracted from the video frame. In some embodiments, step 610 may be implemented by the data acquisition module 502. The frame header may include control information of the video frame. The control information may include synchronization information, address information, error control information, coding information, etc. The synchronization information may include a start time point and/or an end time point of the video frame.

In step 612, a first time point corresponding to the frame header of the video frame may be determined. In some embodiments, step 612 may be implemented by the physical layer processing module 506. As used herein, the first time point may refer to the start time point of the video frame. In some embodiments, the frame header of the video frame may correspond to a frame synchronization pulse signal. The time point that the frame synchronization pulse signal is received at the physical layer may further be determined as the first time point.

In step 614, a second time point may be determined based on the first time point obtained in step 612 and the time period for compressing (and/or packing) the video frame obtained in step 608. In some embodiments, step 614 may be implemented by the physical layer processing module 506. As used herein, the second time point may refer to a time point when the compression and/or packing of the video frame is completed. For example, the second time point may refer to a time point that the compression and/or packing of the sub-frame is completed. Detailed description about the determination of the second time point may be found in FIG. 8A and FIG. 8B.

In step 616, a third time point corresponding to a frame header of a physical layer frame may be synchronized with the second time point. In some embodiments, step 616 may be implemented by the physical layer processing module 506. For example, the third time point corresponding to the frame header of the physical layer frame may be synchronized with the second time point at which the compression and/or packing of the sub-frame is completed. The physical layer frame may control a data transmission and the frame header of the physical layer frame may indicate the start of the data transmission. For example, the frame header of the physical layer frame may indicate the start of transmission of the compressed and/or packed sub-frame through the physical layer. The transmission time of a physical layer frame may be a fixed value as the length of the physical layer frames may be configured as the same. In some embodiments, the transmission time of a present physical layer frame may be extended or shorten such that the frame header of the succeeding physical layer frame and the second time point (i.e., the time point at which the compression and/or packing of the sub-frame is completed) are synchronized. In some embodiments, the transmission time of one or more of the succeeding physical layer frames from the present physical layer frame may be adjusted in a similar manner as transmission time of the present physical layer frame. In some embodiments, only the transmission time of the present physical layer frame is adjusted and by maintaining a certain relationship between the frame rate of the video frame and the physical layer frame, the transmission time of the succeeding physical layer frames may not need to be adjusted. Alternatively, the transmission time of the present physical layer frame may be adjusted each time a video frame is received for compression and transmission.

In some embodiments, the frame synchronization pulse signal indicating the time point of receiving the video frame from the video recording device may be transmitted to the physical layer. A snapshot may be taken on the timer of the physical layer to record the occurrence time point of the frame synchronization pulse signal at the physical layer. The physical layer processing module 506 may calculate a start time point of transmitting the video frame based on the occurrence time point of the frame synchronization pulse signal (i.e., the time point when the video frame from the video recording device for transmission) and the time for compressing and/or packing the video frame. The physical layer processing module 506 may further compare the calculated start time point of transmitting the video frame with a scheduled time point of generating a physical layer frame and determine whether the calculated start time point of transmitting the video frame and the next scheduled time point of generating a physical layer frame are synchronous. When it is determined that the calculated start time point of transmitting the video frame and the next scheduled time point of generating a physical layer frame are asynchronous, the physical layer processing module 506 may adjust the value of the physical layer timer such that the next scheduled time point of generating a physical layer frame is adjusted to be the same as the calculated start time point of transmitting the video frame. Detailed description about the synchronization may be disclosed in FIG. 8A and FIG. 8B.

In step 618, the compressed video frame may be transmitted at the third time point. In some embodiments, step 618 may be implemented by the physical layer processing module 506. For example, the compressed and/or packed sub-frame may be transmitted at the third time point with the corresponding physical layer frame in the physical layer. In some embodiments, the compressed and/or packed video frame may be transmitted to a remote device (e.g., the ground terminal 104, the server 108, the storage 110, etc.) via the UAV transceiver 202.

In step 620, the process 600 may determine whether the transmission of the video frame (or the sub-frames thereof) is completed. If the transmission of the video frame is not completed, the process 600 may proceed back to step 616. For example, a plurality of third time points corresponding to the plurality of the sub-frames may be obtained respectively. Each of the plurality of sub-frames may be transmitted at the corresponding third time point in sequence. The plurality of sub-frames may be transmitted by repeating step 616 to step 618. If the transmission of the video frames is completed, the process 600 may proceed to step 622. In step 622, the processor 204 may wait for next video data. When the next video data is received or recorded, it may be processed by the processor 204 by repeating steps 604-620.

It should be noted that the steps as shown in FIG. 6 are for illustrative purpose, and are not intended to limit the protection scope of the present disclosure. In some embodiments, the process may be accomplished with one or more additional steps not described, and/or without one or more of the steps discussed above. Additionally, the order that the steps of the process 600 are performed in FIG. 6 is not intended to be limiting. For example, step 606 and step 610 may be performed simultaneously or successively. As another example, step 614 and step 616 may be merged into one step. As another example, step 616 may be separated into two steps: a third time point determination and a third time point adjustment. In some embodiments, the video data may include a plurality of video frames. Each of the video frames may be processed by repeating steps 604-620.

Figure 7:
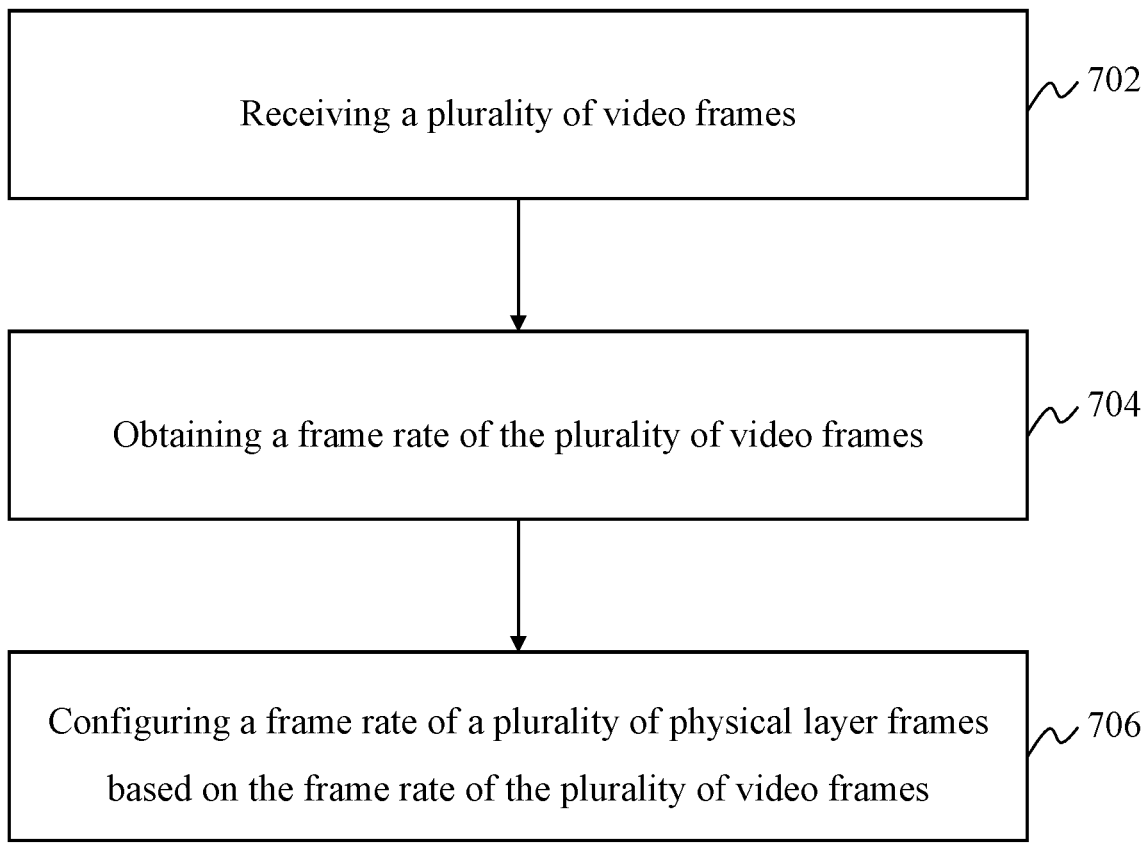
FIG. 7 illustrates a flowchart of an exemplary process for configuring a frame rate of physical layer frames in a UAV system according to some embodiments of the present disclosure.

FIG. 7 illustrates a flowchart of an exemplary process 700 for configuring a frame rate of physical layer frames in a UAV system according to some embodiments of the present disclosure. In some embodiments, the exemplary process 700 may be implemented by the processor 204.

In step 702, a plurality of video frames may be received. The video frames may be extracted from the video data recorded in methods similar to those disclosed in step 602 and/or step 302.

In step 704, a frame rate of the plurality of video frames may be obtained. Each of the video frames may be a still image. The frame rate of the plurality of video frames may refer to the number of still images obtained per second. For example, the frame rate of twenty video frames may be obtained by dividing the total time (in seconds) of the twenty frames by twenty.

In step 706, a frame rate of a plurality of physical layer frames may be configured based on the frame rate of the plurality of video frames. The frame rate of the plurality of physical layer frames may refer to the number of physical layer frames per unit of time (e.g., second or millisecond). As described elsewhere in present disclosure, the frame header of the present physical layer frame may be synchronized with present video frame to reduce wait time and delay. In step 706, the frame rate of the physical layer frames may be configured so that the subsequent physical layer frames may be synchronized with the subsequent video frames, respectively. More particularly, the frame rate of physical layer frames may be adjusted such that each frame header of the physical layer frames is synchronized or almost synchronized with the time point when the compression of the video frame is completed. In some embodiments, the frame rate of the plurality of physical layer frames may be an integer multiple of the frame rate of the plurality of video frames. Merely by way of example, the integer may be 2, 4, 6, 8, 10, 20, 25, 30, etc.

It should be noted that the steps as shown in FIG. 7 are for illustrative purpose, but are not intended to limit the protection scope of the present disclosure. In some embodiments, the process may be accomplished with one or more additional steps not described, and/or without one or more of the steps discussed above. Additionally, the order in which the steps of the process as illustrated in FIG. 7 is not intended to be limiting.

Figure 8A:
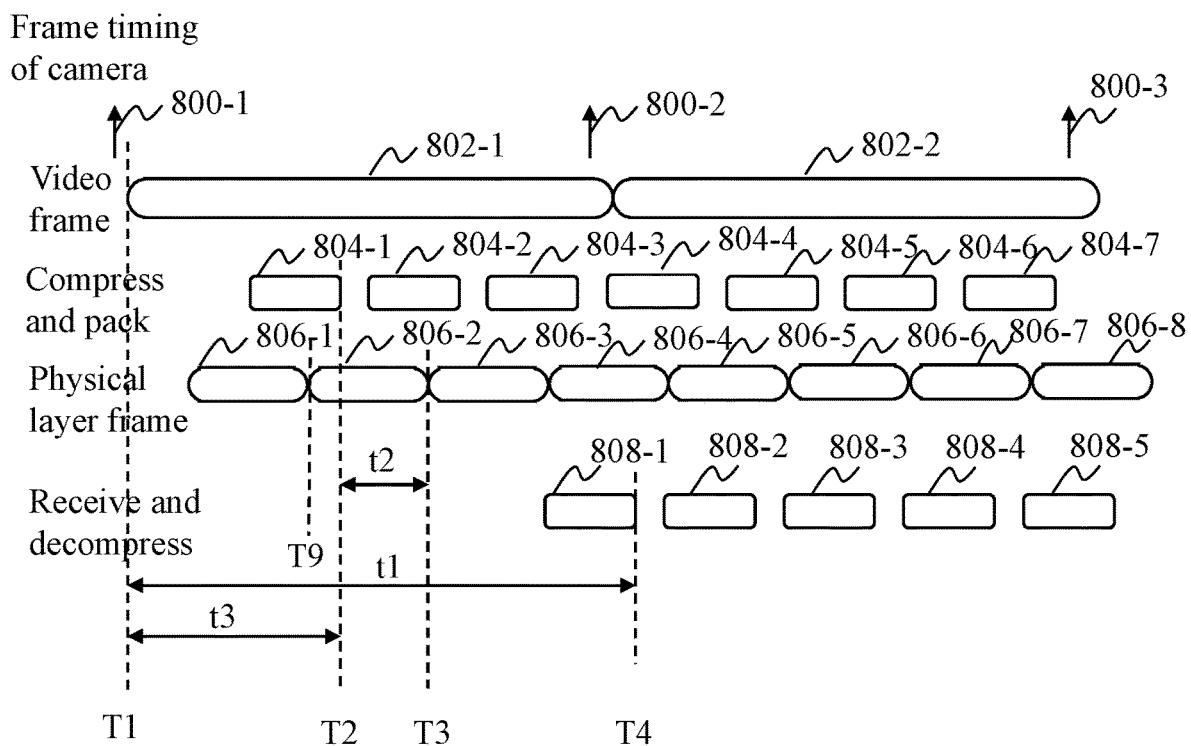
FIG. 8A and FIG. 8B illustrate two schematic diagrams of a video transmission in a UAV system according to some embodiments of the present disclosure.
Figure 8B:
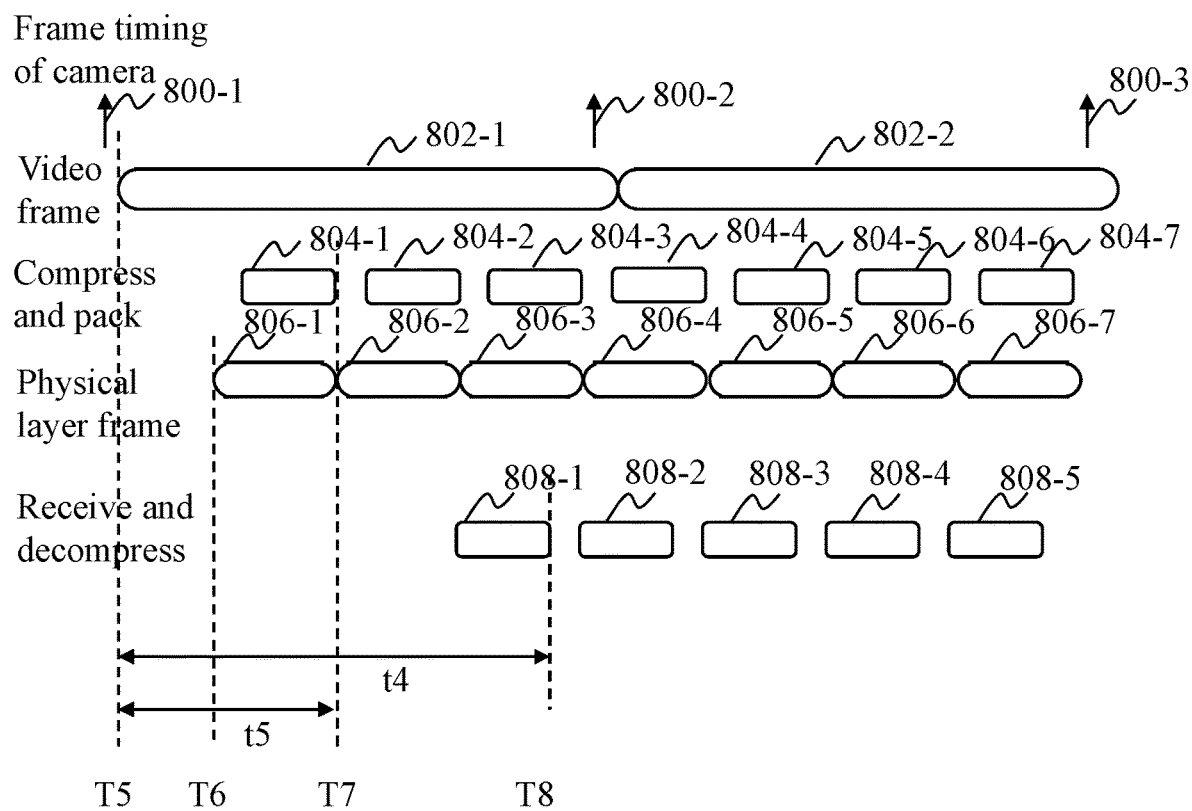

FIG. 8A and FIG. 8B illustrate two schematic diagrams of a video transmission in a UAV system according to some embodiments of the present disclosure. In some embodiments, FIG. 8A and FIG. 8B illustrate a video transmission from the UAV 102 to the ground terminal 104.

In some embodiments, as illustrated in FIG. 8A and FIG. 8B, the video transmission may include capturing video data via the UAV 102, receiving video frames at the UAV 102, compressing the video frames at the UAV 102, processing the video frames at the UAV 102, transmitting the video frames via at the UAV 102 according to the timings of the physical layer frames, transmitting the video frames from the UAV 102 to the ground terminal 104 wirelessly, receiving and decompressing the video frames in the ground terminal 104, etc. A plurality of video frames may be extracted from a real-time video. The plurality of video frames may include a video frame 802-1, a video frame 802-2, etc. In some embodiments, the real-time video may be received at a data interface (e.g., a universal serial bus (USB) interface, an IEEE1394 interface, or a RS-232 interface, etc.) communicatively connected to a camera (e.g., the video recording device 206). A frame timing of the camera may include a plurality of signals that indicate the start time points of the camera to record videos. The plurality of signals may include a signal 800-1, a signal 800-2, a signal 800-3, etc. The video frame 802-1 and the video frame 802-2 may be segmented into sub-frames and compressed into a plurality of compression packages, including a compression package 804-1, a compression package 804-2 . . . a compression package 804-7, etc. The segmentation and compression method may be similar to the description of data compressing and packing module 504. The plurality of compression packages may be transmitted through physical layer under the control of a plurality of physical layer frames including a physical layer frame 806-1, a physical layer frame 806-2 . . . a physical layer frame 806-8, etc. The plurality of compression packages corresponding to the video frames may be received in the ground terminal 104 and may be decompressed as a plurality of decompressed video frames, including a decompressed video frame 808-1, a decompressed video frame 808-2 . . . a decompressed video frame 808-5, etc.

As illustrated in FIG. 8A, a time point T1 may correspond to the frame header of the video frame 802-1. A time point T4 may correspond to the time point when the compression package 804-1 is received and decompressed (the decompressed video frame that correspond to the compression package 804-1 is denoted by 808-1). A time period t3 may correspond to the time period for compressing and/or packing the first sub-frame of the video frame 802-1. A time point T2 may be determined based on the time point T1 and the time period t3. The time point T2 may indicate that the compression package 804-1 is compressed and ready to be transmitted. However, the time point T2 is not synchronized with the time point T3 corresponding to the frame header of the physical layer frame 806-2 (shown as the time point T9). Hence, the compression package 804-1 cannot be transmitted until at a time point corresponding to the frame header of the physical layer frame 806-3 (shown as the time point T3). A wait time period t2 may be defined as the time length that the compression package 804-1 needs to wait before it is transmitted. A time delay may be defined as a time period from the start time of the video frame to the time point when the video frame is available for streaming and/or playback at the ground terminal 104. As shown in FIG. 8A, a time delay t1 may refer to a time period from the time point T1 to the time point T4, which may be unnecessarily extended due to the wait time period t2. The method disclosed in present disclosure may be implemented to eliminate or reduce the wait time, hence to reduce the time delay.

FIG. 8B illustrates a schematic diagram of a video transmission similar to FIG. 8A but with adjusted physical layer frame timings. As illustrated in FIG. 8B, a time point T5 may correspond to the frame header of the video frame 802-1. A time point T8 may correspond to the time point when the compression package 804-1 is received and decompressed (the decompressed video frame that correspond to the compression package 804-1 is denoted by 808-1). A time period t5 may correspond to the time period for compressing and/or packing the first sub-frame of the video frame 802-1. A time point T7 may be determined based on the time point T5 and the time period t5. The time point T7 may indicate that the compression package 804-1 is compressed and ready to be transmitted. A time point T6 may correspond to the frame header of the physical layer frame 806-1. To synchronize the time point corresponding to the frame header of the physical layer frame 806-2, the physical layer frame 806-1 may be adjusted. For example, the length of physical layer frame 806-1 may be extended. As another example, an internal reading of a timer that corresponds to the frame header of the physical layer frame 806-1 may be increased. In particular, the reading of the timer may be adjusted such that the time point corresponding to the frame header of the physical layer frame 806-2 is synchronized with the time point T7. The transmission time of the physical layer frame 806-1 may be extended or shorten so that the time point corresponding to the frame header of the physical layer frame 806-2 is synchronized with the time point T7. A time delay t4 may be defined as a time period from the time point T5 to the time point T8. With the timing adjustment of the physical layer frame 806-1, the compression package 804-1 can be transmitted immediately when the compression is completed, i.e., without the wait time period t2 as shown in FIG. 8A. In some embodiments, only the transmission time of the physical layer frame 806-1 is adjusted and the transmission time of the physical layer frame 806-2 and the subsequent physical layer frames are not adjusted until a subsequent video frame is received.

In some embodiments, as illustrated in FIG. 8B, each of the plurality of video frames may be transmitted with the timing adjustment of a number of physical layer frames. The number of physical layer frames of which the timings need to be adjusted may be relevant with a frame rate of the plurality of physical layer frames and a frame rate of the plurality of video frames. In some embodiments, the frame rate of the plurality of physical layer frames may be configured to be an integer multiple (e.g., twenty) of the frame rate of the plurality of video frames so that the number of physical layer frames of which the timings need to be adjusted may be greatly decreased.

Figure 9:
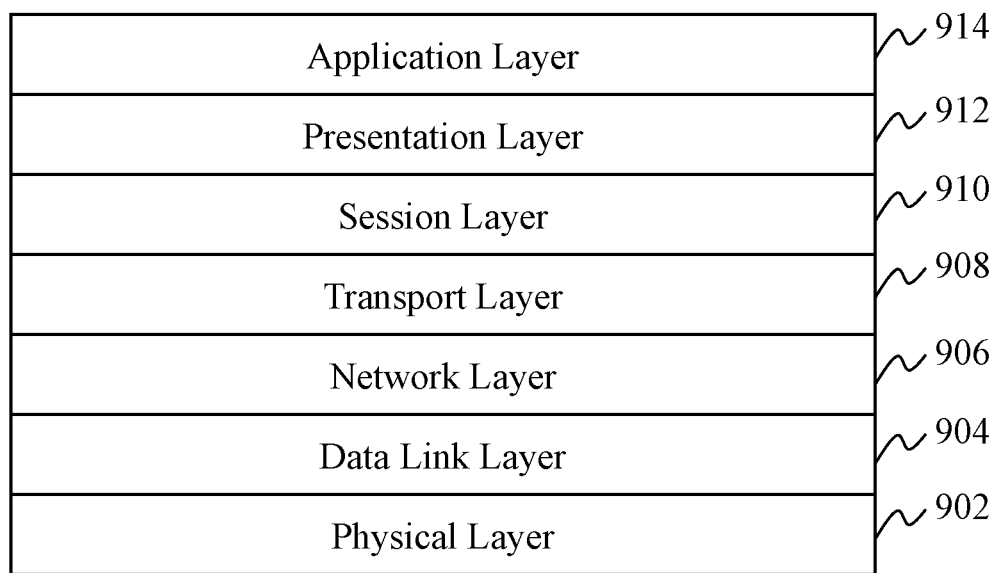
FIG. 9 illustrates a schematic diagram of an exemplary open systems interconnection (OSI) model.

FIG. 9 illustrates a schematic diagram of an exemplary OSI model. The OSI model 900 characterizes and standardizes the communication functions of a telecommunication or computing system. The OSI model 900 defines a networking framework to implement protocols in seven layers. From the bottom up, the seven layers may include a physical layer 902, a data link layer 904, a network layer 906, a transport layer 908, a session layer 910, a presentation layer 912, and an application layer 914.

The physical layer 902 defines electrical and physical specifications of a data connection. The physical layer 902 defines the relationship between a device and a physical transmission medium (e.g., a copper or fiber optical cable, a radio frequency, etc.). The relationship may include layout of pins, voltages, line impedance, cable specifications, signal timing and similar characteristics of connected devices, frequency (5 GHz or 2.4 GHz etc.) of wireless devices, etc. The physical layer 902 may convey a bit stream (e.g., an electrical impulse, light or radio signals, etc.) through network at the electrical and mechanical level. The physical layer 902 may provide hardware means of sending and receiving data on a carrier, including defining cables, cards and physical aspects. In some embodiments, the physical layer processing module 506 and/or the user interface 408 may operate in the physical layer 902.

The data link layer 904 may furnish transmission protocol knowledge, management, handling errors in the physical layer 902, flow control, frame synchronization, etc. In the data link layer 904, data packets may be encoded and decoded into bits. In some embodiments, the data link layer 904 may be divided into two sub layers: the Media Access Control (MAC) layer and the Logical Link Control (LLC) layer. The MAC sub layer may control how a computer on the network gains access to data and permission to transmit the data. The LLC layer may control frame synchronization, flow control and error checking. In some embodiments, the processor 204, the processor 404 of the UAV system 100 may operate in the data link layer 904.

The network layer 906 may provide switching and routing technologies, and creating logical paths for transmitting data from node to node. In some embodiments, the network 106, the UAV transceiver 202, and/or the ground terminal transceiver 402 may operate in the network layer 906. In some embodiments, accessing of the UAV 102 to the network 106 may be operated in the network layer 906. The access may be a competition-based random access or a non-competition-based random access.

The transport layer 908 may provide transparent transfer of data between end systems, or hosts. The transport layer 908 may be responsible for end-to-end error recovery and flow control. The transport layer 908 may ensure complete data transfer. In some embodiments, the network 106, the UAV transceiver 202, and/or the ground terminal transceiver 402 may operate in the transport layer 908. In some embodiments, protocols that operate in the transport layer 908 may include TCP, UDP, SPX, etc.

The session layer 910 may control connections between devices. The session layer 910 may establish, manage and terminate the connections between devices. In some embodiments, the processor 204 and/or the processor 404 may operate in the session layer 910.

The presentation layer 912 may provide independence from differences in data representation (e.g., encryption) by translating from application to network format, and vice versa. The presentation layer 912 may work to transform data into the form that the application layer 914 can accept. In some embodiments, the data compressing and packing module 504 may operate in the presentation layer 912.

The application layer 914 may provide application services, such as file transfers, e-mail, or other network software services, etc. The application layer 914 may perform functions including identifying communication partners, determining resource availability, etc. In some embodiments, protocols that operate in the application layer 912 may include FTP, HTTP, DNS, etc.

It should be noted that the OSI model 900 is provided merely for the purposes of illustration, and is not intended to limit the scope of the present disclosure. For persons having ordinary skills in the art, multiple variations or modifications may be made under the teachings of the present disclosure. For example, a device or module of the UAV system 100 may work in multiple layers simultaneously or subsequently. However, those variations and modifications may not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art that aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

I claim:

1. A method implemented on a computing device including at least one processor and a storage for synchronizing video transmission with physical layer, the method comprising:

determining a first time point corresponding to a frame header of a video frame, the video frame including a plurality of sub-frames;

determining a time period for compressing a sub-frame of the plurality of sub-frames according to a length of the sub-frame and a compression algorithm used for compression the sub-frame;

determining a second time point based on the first time point and the time period for compressing the sub-frame;

adjusting a third time point corresponding to a frame header of a physical layer frame to synchronize the third time point with the second time point; and starting transmitting the sub-frame at the second time point.

2. The method of claim 1, further comprising:
generating the physical layer frame at the second time point.

3. The method of claim 1, further comprising:
compressing the sub-frame before transmitting the sub-frame at the second time point.

4. The method of claim 1, wherein the frame header of the video frame corresponds to a frame synchronization pulse signal.

5. The method of claim 1, wherein the video frame is extracted from a real-time video stream transmitted by a video recording device.

6. The method of claim 1, wherein the video frame is extracted from a real-time video received at a data interface communicatively connected to a video recording device.

7. The method of claim 1, further comprising:
obtaining a frame rate of the video frame; and
configuring a frame rate of the physical layer frame based on the frame rate of the video frame.

8. The method of claim 7, wherein the frame rate of the physical layer frame is an integer multiple of the frame rate of the video frame.

9. A system for synchronizing video transmission with physical layer, the system comprising:
a memory that stores one or more computer-executable instructions; and
one or more processors configured to communicate with the memory, wherein when executing the one or more computer-executable instructions, the one or more processors are directed to:
determine a first time point corresponding to a frame header of a video frame, the video frame including a plurality of sub-frames;
determine a time period for compressing a sub-frame of the plurality of sub-frames according to a length of the sub-frame and a compression algorithm used for compression the sub-frame;
determine a second time point based on the first time point and the time period for compressing the sub-frame;
adjust a third time point corresponding to a frame header of a physical layer frame to synchronize the third time point with the second time point; and
start transmitting the sub-frame at the second time point.

10. The system of claim 9, wherein the one or more processors are further directed to:
generate the physical layer frame at the second time point.

11. The system of claim 9, wherein the one or more processors are further directed to:
compress the sub-frame before transmitting the sub-frame at the second time point.

12. A non-transitory computer readable medium including executable instructions that, when executed by at least one processor, cause the at least one processor to effectuate a method comprising:
determining a first time point corresponding to a frame header of a video frame, the video frame including a plurality of sub-frames;
determining a time period for compressing a sub-frame of the plurality of sub-frames according to a length of the sub-frame and a compression algorithm used for compression the sub-frame;
determining a second time point based on the first time point and the time period for compressing the sub-frame;
adjusting a third time point corresponding to a frame header of a physical layer frame to synchronize the third time point with the second time point; and
starting transmitting the sub-frame at the second time point.

* * * * *